3,556,871
METHOD OF MAKING BLACK STAINLESS STEEL SHEET
Harold L. Helgert, Hayden B. Powell, and Robert K. Teorsky, Natrona Heights, Pa., assignors to Allegheny Ludlum Steel Corporation, Brackenridge, Pa., a corporation of Pennsylvania
No Drawing. Filed Apr. 15, 1968, Ser. No. 721,159
Int. Cl. C23f 7/04
U.S. Cl. 148—6.14          6 Claims

ABSTRACT OF THE DISCLOSURE

Described herein is a method of producing blackened stainless steel strip, sheet and the like, and formed articles of blackened stainless steel. The strip is produced by oxidizing the stainless steel surface to form a blackened, porous oxide coating, impregnating said coating with an alkali metal silicate, drying and fusing the silicate by heating above 1400° F., and thereafter flattening the stainless steel to permit fabrication. The formed articles are made by surface conditioning prior to oxidizing.

---

This invention relates to blackened stainless steel suitable for architectural applications. More particularly, the invention relates to a process for making blackened stainless steel sheet suitable for fabrication into architectural shapes.

Previously, coated black colored stainless steel has been made by treating the surface of the steel to obtain a black oxide, and then applying a protective coating of a water-soluble alkali metal silicate, baking the same to remove the water. The surface of the stainless steel may be blackened by coating the same with a thickened or gelled solution of sodium or potassium dichromate in water, and subsequently heating the coated surface to sufficiently high temperature for a period of time to form a uniform, black, porous oxide coating in the range of 1,000 to 500,000 angstroms thick. The excess coating material and loose black oxide at the outer interface is then scrubbed off with water, leaving the surface in a condition suitable for sealing with a water-soluble alkali metal silicate solution. The general composition of a suitable blackening solution comprises sodium or potassium dichromate, a thickening agent, and a wetting agent. A typical formulation is 3,000 grams sodium dichromate, 10 grams "Methocel," 20 ml. (10% solution) "Wetanol," and 2,000 ml. distilled water.

The blackening solution can be applied to the stainless steel material by dipping, swabbing, brushing, spraying, rolling or any other means of application. The solution is applied in a sufficient thickness to thoroughly cover the surface and may be applied in more than one coat. After coating, the blackening reaction is produced by placing the sample in an air furance at temperatures above 600° F. and preferably between 950° F. and 1100° F. for approximately 10 minutes to obtain a good, deep, uniform black. Below 950° F. the color tends to be grey or brown and is sometimes nonuniform. Above 1050° F. the color becomes nonuniform and has a tendency to turn green.

The thickness of the oxide films (which has been analyzed as almost entirely $\alpha$-$Fe_2O_3$ with traces of $\alpha$-Fe or chromium) obtained by these methods varies from 1000 angstroms up to 500,000 angstroms depending upon the method used and the conditions of the oxidation.

The formulation of the coating solution involves the mixing of an alkali metal silicate, a wetting agent, and distilled water. Different concentrations of coatings can be formulated from "N" grade sodium silicate (Philadelphia Quartz, Philadelphia, Pa.) which is used as a 100% solution. The wetting agents used are Wetanol (Glyco Products Inc., New York) and Alkanol HCS (E. I. du Pont de Nemours & Company, Wilmington, Del.). The coating is applied by dipping, spraying, flow coating, roll coating and any other method of application. After the coating has been applied, it is baked at temperatures above 300° F. to remove the water. The more water that is driven off the more insoluble the silicate film becomes and is subsequently more difficult to rehydrate. For most applications the coatings are applied to give approximately 50 microinches of cured coating at 600° F. for 5–10 minutes. This is a practical curing cycle and a durable protective coating is obtained.

The coating produced by the practice described above suffered from many problems. Thus, for example, due to poor spray applications the spray pattern or uneven distribution of coating may be detected on Type 304 stainless steel with a wheelabrated and pickeled finish which has been blackened by the dichromate process. This spray pattern may be observed when 4' x 8' sheets are sprayed with a 30% sodium silicate coating solution on a coating line, and more coating with subsequent buildup of thickness may be necessary to cover up this spray pattern. Upon exposure to high humidity under atmospheric conditions, the coatings produced as described have turned white in areas all over the black sheet. In humidity tests, the coated side of 4" x 8" samples are exposed to 80°–90° water vapor and the other sides of the samples are at room temperature. This sets up a temperature differential and causes the water vapor to condense on or in the coating, which is a very severe atmospheric condition. This test differs from regular fog humidity tests in which the sample is completely in the humidity cabinet and there is no temperature difference.

In accordance with the invention there is provide a method for producing blackened stainless steel sheet, strip and the like, and formed articles of blackened stainless steel. Blackened stainless steel material is produced by oxidizing the surface of stainless steel sheet, strip or the like to produce a porous oxide coating, impregnating the coating with an alkali metal silicate, drying and fusing the silicate coating by heating to a temperature above 1400° F., preferably about 1600° F., and thereafter flattening the stainless steel to permit fabrication thereof. Flattening may be performed by stretching or stretcher levelling. Formed articles of blackened stainless steel may be produced in accordance with the invention by forming stainless steel sheet, strip and the like into a shaped article, surface conditioning the formed article and oxidizing the surface of the formed article to produce a black, porous oxide coating, impregnating the oxide coating with an alkali metal silicate, drying and fusing said silicate coating by heating to a temperature above 1400° F.

The following examples will illustrate practicing the invention to produce blackened stainless steel superior to similar products produced by conventional methods. A sample of Type 304 stainless steel with a wheelabrated and pickled finish which had been blackened by the molten dichromate process and coated with two coats of 30% sodium silicate solution and cured after each coat was exposed in a QCT cabinet. This coated black sample had been previously tested for adaptability to welding, and a number of studs had been spot welded to the sample. Upon exposure to the condensing humidity the coating developed white spots except in the areas immediate to the spot weld which had reached higher temperatures. An untreated sample of the material which had been tested previously in the QCT cabinet and which turned white due to the heavy coating and improper curing was fired or fused at 1800° F. for five minutes and a clear, glassy black sample was obtained. Upon exposure to the QCT for the same period of time, approximately 24 hours, no whitening was observed. After five months' exposure, a similar sample showed no signs of whitening or deterioration of any kind. Additional material processed in the same manner was fused at different times and temperatures, and is described in Table I. Removal of the water around 1200° F. to 1400° F. caused the silicate coating to bubble, and turn white. Temperatures of 1500° F. and above for five minutes caused the silicate to flow out and become clear. Fusing of the sodium silicate coatings was not carried out above 1200° F. in conventional processes because of the bubbling or frothing of the coating and the oxides formed by heat tint or chemical oxidation described in Pat. 3,125,471 are not thick enough (1,000 angstroms or less) to prevent further oxidation of the surface or not porous enough to allow the fused silicate to flow out and become a continuous film, and tend to dissolve in the silicate glass even at temperatures as low as 700° F. Attempts to fuse thick (100 μin.) sodium silicate coated heat tint samples resulted in the oxide's dissolving in the fused silicate at temperatures of 1500° F. or higher, and the silicate beaded up and allowed the substrate to become oxidized and nonuniform in appearance.

TABLE I

Samples of Type 304 stanless steel wheelabrated and pickled material, which had been blackened using the molten dichromate process and spray coated with a 30% sodium silicate solution, were cured at 600° F. after each coat was fused at different times and temperatures. A very thick (approximately 200 μin.) coating was obtained.

(1) As received—good uniform black with glossy appearance.
(2) 1200° F.—5 min. entire surface turned white, bubbled coating.
(3) 1300° F.—5 min. entire surface turned white, not as bad as #2.
(4) 1400° F.—5 min. whiteness diminishing, more black showing through.
(5) 1500° F.—5 min. approaching good uniformity in black, some white still present.
(6) 1600° F.—5 min. coating appears to have fused, very few white particles showing.
(7) 1600° F.—10 min. fused coating very smooth. Gloss approaching original sample.
(8) 1600° F.—15 min. same as #7.
(9) 1700° F.—5 min. same as #7.
(10) 1800° F.—5 min. isolated agglomerates over entire surface.
(11) 1900° F.—5 min. more agglomerates over the surface.
(12) 2000° F.—5 min. large beads over surface of sample.

To produce formed articles of blackened stainless steel it is necessary to surface condition the stainless steel prior to oxidizing. The surface conditioning is a form of abrasion where surface defects are corrected. Typical formed articles which may be produced are tubular products such as those adapted for architectural applications. However, other, more complicated shapes may be fabricated in a similar manner and blackened by oxidizing, as described above. The blackened oxide coating is finished by impregnating with an alkali metal silicate and sealed by fusing the silicate at a temperature above about 1400° F. In the case of blackened stainless steel sheets and strip, etc., which are to be formed after treatment to color the surface, it is necessary to flatten the same before fabricating into shape.

In practice, the improved method comprises oxidizing the surface of the stainless steel using the dichromate process described above to achieve a porous oxide layer thick enough to protect the surface of the material and to allow the silicate subsequently applied to flow into the oxide layer where it is later fused. Water-soluble sodium silicate may be applied by any of several methods and subsequently cured after each coat at approximately 600° F. for five minutes to remove the water of solution, with a resulting thickness of 100 μin. or more. The silicate is then fused at 1400° F. or above for a period of time to give a continuous water-free coating.

The use of a water-soluble fusible coating is quite an advantage over the usual glass frit, dip or slurry which is limited to methods of application common with suspensions or slurries. The water-soluble silicate also penetrates the porous oxide and has better contact than a large particle size material that melts on the surface. Also, fusing or baking at elevated temperatures has not been practical before due to oxidation of the surface giving a nonuniform color appearance, and is not suited for architectural application. Our blackening process eliminates this problem and allows a glassy, black product with excellent weathering properties to be obtained.

The following tests were conducted to determine the properties of the fused black coating.

Samples of Type 304 stainless steel with a wheel-abrated and pickled finish, size 4" x 8", which had been blackened using the dichromate process and spray coated with 30% sodium silicate, were dip coated and cured at 600° F. to obtain the thicker coating. The samples were then fused at 1800° F. for five minutes to obtain a glossy, black continuous coating. After five months' exposure to salt spray, Weather-Ometer, fog humidity, QCT cabinet and atmospheric conditions, there was no change in the samples.

STEAM TEST

A sample of regular blackened stainless steel processed with one coat of approximately 50 μin. of cured coating was tested in comparison with the high temperature fused material in a steam pressure autoclave. The regular material showed signs of deterioration after 15 minutes' exposure to five pounds of steam pressure. The high temperature or fused material began to show signs of the coating dissolving only after four hours at five pounds of steam pressure.

ABRASION RESISTANCE

Abrasion tests were run on 4" x 4" samples of fused (1500°–1800° F.) material, regular (600° F.) cured material and as-blackened or uncoated material. The test was carried out on a Taber Abrader using CS–10 wheels with a load of 1000 grams. This evaluation was based on the number of wear cycles to initially break through the coating to the substrate. After 10 cycles on the as-blackened or uncoated sample, the black oxide was removed showing the shiny substrate. The regular cured material showed slight break through after 100 cycles and the fused material showed slight break through after 1,000 cycles.

CHEMICALS

Samples of the fused material were spot tested for 24 hours with 10% solutions of the following chemicals:

(a) Sodium chloride—no change
(b) Hydrochloric acid—no change
(c) Sodium hydroxide—no change
(d) Sulfuric acid—the sample became speckled
(e) Nitric acid—removed the coating near the edges of the sample, may be due to fracture relating to the shear edge
(f) Oil—no change
(g) Cement—no change, some residue.

IMPACT TEST

Impact tests were performed using a Gardner Impact Tester, and tests indicate the sample could not be compressed. Break-up of the coating occurred at 10 ft.-pounds direct impact. With reverse impact testing, the .050" thick sample showed no sign of coating damage at 80 ft.-pounds impact.

BEND BRAKE TEST

A 4" x 8" panel of fused material was tested on the conical mandrel tested and no spalling or chip was observed over the entire range of bend tests. Cellophane tape was applied to the bend, and no coating or black oxide was observed when the tape was removed.

SOLVENTS

Exposure of the fused material to methylene chloride, ethyl alcohol, methyl ethyl ketone and butyl acetate for twenty-four hours resulted in no change to the coating.

It is apparent from the above that various changes and modifications may be made without departing from the invention. Accordingly, the scope of the invention should be limited only by the appended claims.

We claim:

1. A method of producing formed articles of blackened stainless steel which comprises forming stainless steel sheet, strip and the like into a shaped article, surface conditioning said formed article, oxidizing the surface of said formed article to produce a blackened, porous oxide coating of from 1,000 to 500,000 angstroms thick, impregnating said oxide coating with an alkali metal silicate, and drying and fusing said silicate by heating to a temperature above 1400° F.

2. A method according to claim 1 wherein said stainless steel is oxidized with a dichromate solution of an alkali metal.

3. A method according to claim 1 wherein said stainless steel is formed into a tubular article.

4. A method of producing blackened stainless steel sheet, strip and the like which comprises, oxidizing the surface of said stainless steel to produce a blackened porous oxide coating of from 1,000 to 500,000 angstroms thick, impregnating said oxide coating with an alkali metal silicate, drying and fusing said silicate by heating to a temperature above 1400° F., and flattening said stainless teel to permit fabrication thereof.

5. A method according to claim 4 wherein said stainless steel is oxidized with a dichromate solution of an alkali metal.

6. A method according to claim 4 wherein said stainless steel is formed into a tubular article.

References Cited

UNITED STATES PATENTS

| 2,485,061 | 10/1949 | Nebe | 148—6.35X |
| 2,978,361 | 4/1961 | Seidl | 117—169X |
| 3,125,471 | 3/1964 | Conner | 148—6.35X |
| 3,208,874 | 9/1965 | Conner | 117—135.1 |
| 3,437,532 | 4/1969 | Helgert et al. | 148—6.35X |

RALPH S. KENDALL, Primary Examiner

U.S. Cl. X.R.

117—135.1; 148—6.11, 6.35